(12) United States Patent
Teramoto (10) Patent No.: US 10,545,551 B2
(45) Date of Patent: Jan. 28, 2020

(54) COMMUNICATION DEVICE AND COMMUNICATION METHOD FOR TRANSMITTING DATA ACCORDING TO A PREDETERMINED COMMUNICATION STANDARD

(71) Applicant: SONY CORPORATION, Tokyo (JP)

(72) Inventor: Satoshi Teramoto, Saitama (JP)

(73) Assignee: SONY CORPORATION, Tokyo (JP)

( * ) Notice: Subject to any disclaimer, the term of this patent is extended or adjusted under 35 U.S.C. 154(b) by 164 days.

(21) Appl. No.: 15/534,128

(22) PCT Filed: Oct. 30, 2015

(86) PCT No.: PCT/JP2015/080859
§ 371 (c)(1),
(2) Date: Jun. 8, 2017

(87) PCT Pub. No.: WO2016/103916
PCT Pub. Date: Jun. 30, 2016

(65) Prior Publication Data
US 2019/0094933 A1    Mar. 28, 2019

(30) Foreign Application Priority Data
Dec. 24, 2014 (JP) ................. 2014-260014

(51) Int. Cl.
*G06F 1/00* (2006.01)
*G06F 1/26* (2006.01)
(Continued)

(52) U.S. Cl.
CPC ............. *G06F 1/266* (2013.01); *H04N 5/63* (2013.01); *H04N 21/43632* (2013.01); *H04N 21/4126* (2013.01); *H04N 21/4436* (2013.01)

(58) Field of Classification Search
None
See application file for complete search history.

(56) References Cited

U.S. PATENT DOCUMENTS

2004/0064603 A1* 4/2004 Sasaki ................ G06F 1/3203
                                                        710/33
2007/0266270 A1* 11/2007 Ito ........................ G06F 1/3268
                                                        713/324
(Continued)

FOREIGN PATENT DOCUMENTS

| AU | 2012215788 A1 | 11/2012 |
|----|---------------|---------|
| CA | 2800347 A1    | 8/2012  |

(Continued)

OTHER PUBLICATIONS

International Search Report and Written Opinion of PCT Application No. PCT/JP2015/080859, dated Jan. 26, 2016, 02 pages of English Translation and 07 pages of ISRWO.

*Primary Examiner* — Nitin C Patel
(74) *Attorney, Agent, or Firm* — Chip Law Group (57) ABSTRACT

A communication device for starting power supply before establishment of a link is provided. A device to be connected to a source device or a sink device includes a device information presenting unit for presenting device information on power supply of the device. The device information presenting unit presents a device type (no need power device, need power device, and provide power device). At the time when the device is connected to an MHL connector of the source device or the sink device, even when the link is not established, the source device or the sink device reads information from the device information presenting unit and appropriately starts to supply and demand electric power.

8 Claims, 8 Drawing Sheets

(51) Int. Cl.
*H04N 5/63* (2006.01)
*H04N 21/4363* (2011.01)
*H04N 21/41* (2011.01)
*H04N 21/443* (2011.01)

(56) References Cited

U.S. PATENT DOCUMENTS

| | | | | |
|---|---|---|---|---|
| 2009/0089850 A1* | 4/2009 | Nakajima | ............... | H04N 5/775 725/118 |
| 2009/0116547 A1* | 5/2009 | Lida | ............... | H04L 5/143 375/240.01 |
| 2009/0177818 A1* | 7/2009 | Shim | ............... | G06F 3/14 710/100 |
| 2010/0225813 A1* | 9/2010 | Hirono | ............... | H04N 5/50 348/554 |
| 2011/0055407 A1* | 3/2011 | Lydon | ............... | G06F 13/385 709/228 |
| 2013/0021439 A1 | 1/2013 | Tao et al. | | |
| 2013/0183045 A1* | 7/2013 | Niiho | ............... | G02B 6/28 398/142 |
| 2014/0001884 A1* | 1/2014 | Doi | ............... | G06F 13/4072 307/115 |
| 2014/0211097 A1* | 7/2014 | Oh | ............... | H04N 5/63 348/730 |
| 2014/0312701 A1* | 10/2014 | Hong | ............... | H02J 7/008 307/80 |

FOREIGN PATENT DOCUMENTS

| | | |
|---|---|---|
| CN | 102972034 A | 3/2013 |
| EP | 2541955 A1 | 1/2013 |
| EP | 2685386 A1 | 1/2014 |
| JP | 2012-169702 A | 9/2012 |
| JP | 5330574 B1 | 10/2013 |
| KR | 10-2014-0000137 A | 1/2014 |
| RU | 2012141875 A | 4/2014 |
| WO | 2012/108393 A1 | 8/2012 |

\* cited by examiner

Device Type

<No Need Power Device>
- Information not detected (Normal Cable)
- Cable with Information <Need Power Device>
- Direct Attached Device
- Active Cable
- Dongle (Need Power)

<Provide Power Device>
- Charger
- Dongle (Provide Power)

FIG. 8

COMMUNICATION DEVICE AND COMMUNICATION METHOD FOR TRANSMITTING DATA ACCORDING TO A PREDETERMINED COMMUNICATION STANDARD

CROSS REFERENCE TO RELATED APPLICATIONS

This application is a U.S. National Phase of International Patent Application No. PCT/JP2015/080859 filed on Oct. 30, 2015, which claims priority benefit of Japanese Patent Application No. JP 2014-260014 filed in the Japan Patent Office on Dec. 24, 2014. Each of the above-referenced applications is hereby incorporated herein by reference in its entirety.

TECHNICAL FIELD

The technology disclosed in the present specification relates to a communication device and a communication method for transmitting data according to a predetermined communication interface standard, and for example, relates to a communication device and a communication method for transmitting a video and audio signal while complying with the mobile high-definition link (MHL™).

BACKGROUND ART

In recent years, a portable device which can display a video with high definition such as a smartphone and a tablet has been widely used. Accordingly, development in the MHL which is a communication interface standard to transmit a video at high speed for the portable device has been proceeded (for example, refer to Patent Document 1).

As a communication interface standard for realizing uncompressed digital video transmission, the high definition multimedia interface (HDMI®) (registered trademark) is exemplified. Whereas, main characteristics of the MHL is to minimize a mounting area as a minimum pin configuration necessary for video transmission and to assist power supply.

The MHL devices are classified into three categories, i.e., a source device for transmitting a video signal, a sink device for receiving and displaying the video signal, and a dongle device for converting the video signal in the MHL format into the other video signal. Then, an MHL cable which satisfies the MHL standard is used to connect the MHL devices and to transmit signals between the MHL devices. The source device includes a personal computer, a smartphone, a tablet terminal, a game machine, and a digital camera. Also, the sink device includes a display device such as a digital TV. A single MHL cable connects the source device to the sink device so that a video with high definition can be transmitted and power can be supplied (charge the source device).

In a communication system according to the MHL standard, basically, regular power supply is started after a link is established between the source device and the sink device. Therefore, when the MHL cable used to connect between the source device and the sink device is an active cable and when the source device (Direct Attached Device) is directly connected to the sink device without using the MHL cable, there is a problem in that a failure such that start-up is not available due to short power supply at the time of start-up is caused or that it is necessary to have an external power supply.

CITATION LIST

Patent Document

Patent Document 1: Japanese Patent Application Laid-Open No. 2012-169702

SUMMARY OF THE INVENTION

Problems to be Solved by the Invention

A purpose of the technology disclosed in the present specification is to provide an excellent communication device and communication method which can preferably supply power to/from a communication partner to be connected according to a predetermined communication interface standard.

Solutions to Problems

The technology disclosed in the present specification has been made in consideration of the above problems. A first aspect of the technology is a communication device including a connection unit which connects an external device according to a predetermined communication interface standard and a control unit which controls power supply to/from the external device on the basis of device information read from a device information presenting unit included in the external device.

According to a second aspect of the technology disclosed in the present specification, the device information presenting unit of the external device has device type information indicating which one of a no need power device, a need power device, and a provide power device the external device is. Also, the control unit of the communication device according to the first aspect is configured to control power supply to/from the external device on the basis of the read device type information.

According to a third aspect of the technology disclosed in the present specification, the control unit of the communication device according to the second aspect is configured to request the external device to supply power when the external device connected to the connection unit is a provide power device.

According to a fourth aspect of the technology disclosed in the present specification, the control unit of the communication device according to the second aspect is configured to supply power to the external device when the external device connected to the connection unit is a need power device.

According to a fifth aspect of the technology disclosed in the present specification, the control unit of the communication device according to the fourth aspect is configured to control power supply to the external device on the basis of a necessary power amount of the external device read from the device information presenting unit.

According to a sixth aspect of the technology disclosed in the present specification, the control unit of the communication device according to the fifth aspect is configured to display an error when the control unit cannot cope with the necessary power amount of the external device.

According to a seventh aspect of the technology disclosed in the present specification, the control unit of the communication device according to the first aspect is configured to display an error when the control unit cannot read device information from the external device connected to the connection unit.

According to an eighth aspect of the technology disclosed in the present specification, the control unit of the communication device according to the first aspect is configured to control power supply to/from the external device before the link with the external device is established on the basis of the predetermined communication interface standard.

According to a ninth aspect of the technology disclosed in the present specification, the communication interface standard is the MHL standard.

Also, a tenth aspect of the technology disclosed in the present specification is a communication method including a connection step of connecting an external device according to a predetermined communication interface standard and a control step of controlling power supply to/from the external device on the basis of device information read from a device information presenting unit included in the external device.

Effects of the Invention

According to the technology disclosed in the present specification, an excellent communication device and communication method can be provided which can avoid a failure at the time of start-up by starting power supply to/from a communication partner to be connected according to a predetermined communication interface standard before a link is established.

Note that the effects described in the present specification are only exemplary, and the effect of the present invention is not limited to those. Also, there is a case where the present invention has an additional effect other than the effects described above.

Other purpose, characteristics, and advantages of the technology disclosed in the present specification would be obvious by detailed description on the basis of the embodiment described below and the attached drawings.

MODE FOR CARRYING OUT THE INVENTION

An embodiment of the technology disclosed in the present specification is described in detail below with reference to the drawings.

Figure 1:
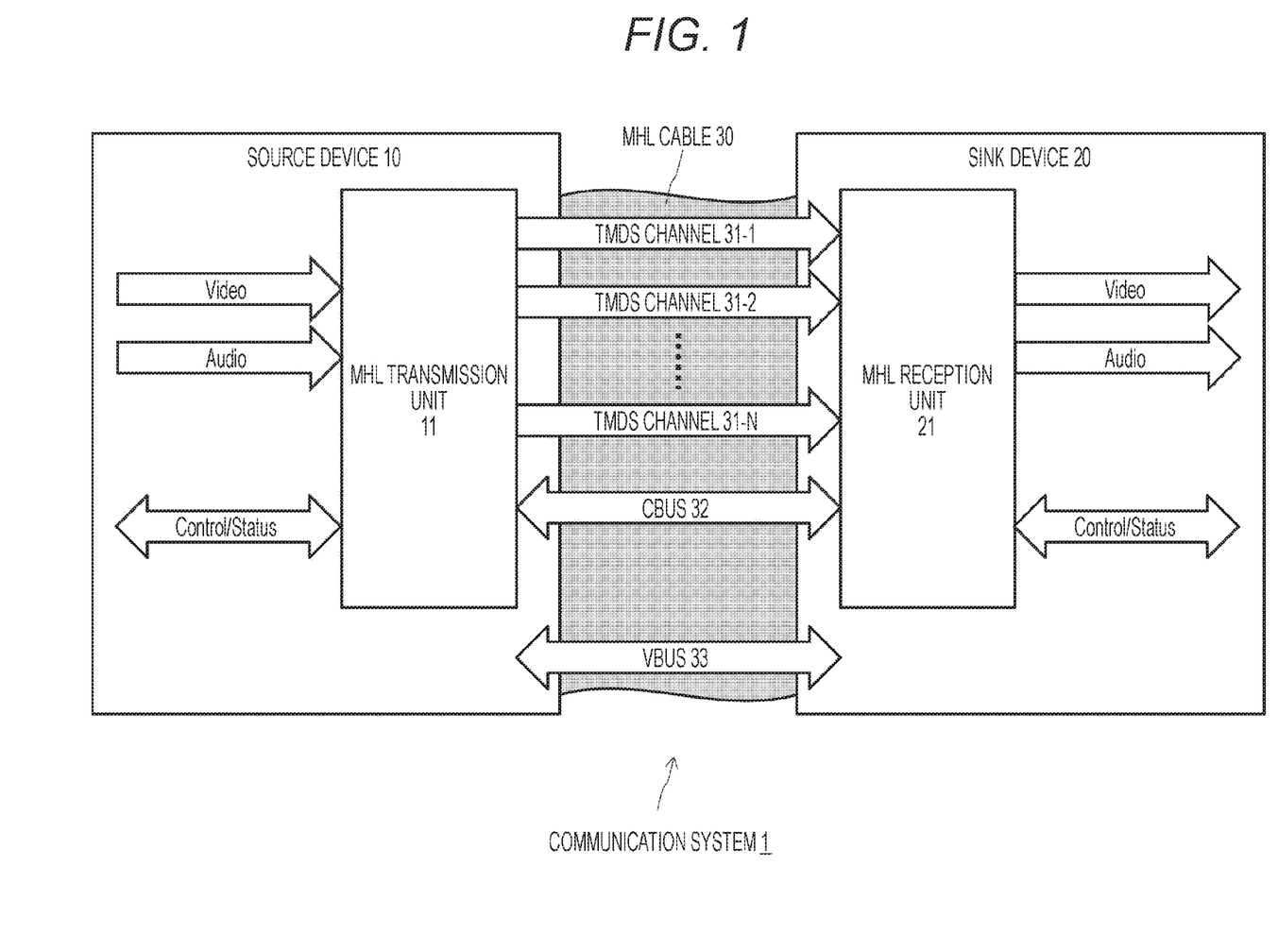
FIG. 1 is a schematic diagram of a basic configuration of a communication system 1.

In FIG. 1, a basic configuration of a communication system 1 for transmitting a video and a voice is schematically illustrated. The communication system 1 is configured of a combination of a source device 10 and a sink device 20. The source device 10 is a supply source of video information and audio information, and a portable device such as a smartphone is assumed as the source device 10. Also, the sink device 20 is an output destination of the video information and the audio information, and an installed apparatus having a large screen such as a television receiver is assumed as the sink device 20.

The source device 10 includes an MHL transmission unit 11, and an MHL sink device 20 includes an MHL reception unit 21. An MHL cable 30 complying with the MHL standard connects between the MHL transmission unit 11 and the MHL reception unit 21.

The MHL cable 30 includes N transition minimized differential signaling (TMDS) channels 31-1, ..., and 31-N, a control bus (CBUS) or an eCBUS 32, and a voltage bus (VBUS) 33.

The TMDS channels 31-1, ..., and 31-N are differential line pairs mainly used to transmit uncompressed moving-image video information and audio information. A single TMDS channel is referred to as a "lane". In the example illustrated in FIG. 1, the communication system 1 includes N lanes. Note that a single lane is provided in versions 1 to 3 of the MHL. However, in the technology disclosed in the present specification, it is assumed that the source device 10 and the sink device 20 are connected to each other with a plurality of lanes. By using multiple lanes, for example, a bandwidth can be higher, and a high-resolution video signal can be transmitted. Also, the TMDS is a transmission method of a digital video signal standardized by the Video Electronics Standards Association (VESA). The detailed description on the TMDS is omitted.

The CBUS 32 is a bidirectional data bus mainly used to control video and audio transmission and used for communication to perform device cooperation. The CBUS 32 is referred to as a CBUS in versions 1 and 2 of the MHL and is referred to as an eCBUS since version 3. However, the CBUS 32 is collectively referred to as a "CBUS" below.

The VBUS 33 is a power source line mainly used to supply power. Basically, for example, 5-volt power is supplied in a direction from the sink device 20 such as a television receiver to be connected to a commercial power supply to the source device 10 driven by a battery such as a smartphone.

Video information (Video) and audio information (Audio) reproduced by an information reproduction unit which is not shown are supplied to the MHL transmission unit 11 of the source device 10. Then, the MHL transmission unit 11 transmits the moving-image video information and the audio information by using one or two or more lanes of the TMDS channels 31-1, ..., and 31-N in the MHL cable 30.

On the other hand, when receiving the moving-image video information and the audio information transmitted by using one or more lanes of the TMDS channels 31-1, ..., and 31-N in the MHL cable 30, the MHL reception unit 21 of the sink device 20 displays it on a screen and outputs voice by using an information output unit which is not shown.

In an MHL process in a normal mode, when the sink device can receive the video and audio signal by using a TMDS signal, the sink device notifies the source device of that via the CBUS. When receiving this notification, the source device reads extended display identification data (EDID) and the like of the sink device by using the CBUS and obtains video and audio format supported by the sink device and capability information to optimize a transmission method. In addition, to prevent unauthorized use of a digital content, the High-Bandwidth Digital Content Protection (HDCP) authentication is performed on the CBUS.

In the communication system 1 illustrated in FIG. 1, basically, after the link has been established between the source device 10 and the sink device 20, regular power supply from the sink device 20 to the source device 10 via the VBUS 33 can be started.

However, when the MHL cable 30 used to connect between the source device 10 and the sink device 20 is an active cable and when it is necessary to supply power to a device to be directly connected to the source device 10 or the sink device 20 without an MHL cable (Direct Attached Device), there is a problem in that a failure such that start-up is not available due to the short power supply at the time of start-up is caused or that it is necessary to have an external power supply.

Therefore, in the present specification, the technology is proposed which includes the device information presenting unit for presenting device information regarding power supply to the device to be connected to the source device or the sink device. Exemplary configurations of the communication system for connecting the device including the device information presenting unit to the source device or the sink device are illustrated in FIGS. 3 to 6. However, the details of the configurations of the communication system are described below.

When the device is connected to an MHL connector of the source device or the sink device, the source device or the sink device can read information from the device information presenting unit even when the link is not established. The device information presenting unit can be formed of a memory chip which stores the device information in a nonvolatile manner. Alternatively, the device information presenting unit may be a member which can electrically or mechanically identify the device information according to a combination of low/high level of the pin included in the connector, the shape of the connector, and the like.

Figure 2:
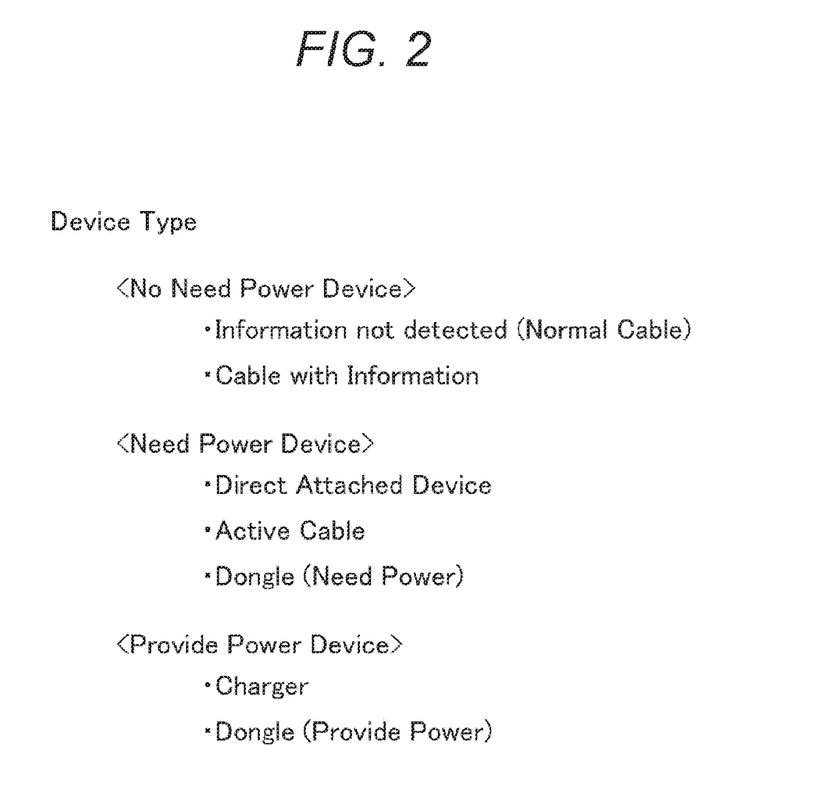
FIG. 2 is a diagram in which device types presented by a device information presenting unit are exemplified.

The device information presented by the device information presenting unit includes device types regarding the power supply. The device type is roughly classified into three kinds, i.e., a no need power device, a need power device, and a provide power device. Regarding the need power device, it is preferable that the device information presenting unit present a power amount necessary for the need power device as the device information. In FIG. 2, the device types presented by the device information presenting unit are exemplified.

The no need power device is a cable in which the device information presenting unit presents that power is not necessary (Cable with Information), a normal cable which cannot detect the device information (or does not include device information presenting unit) (Normal Cable, Information not detected), and the like.

The need power device is a direct attached device to be directly connected to the source device or the sink device, an active cable, and a dongle which needs power supply.

Also, the provide power device is a charger, a dongle which can supply power, and the like.

Figure 3:
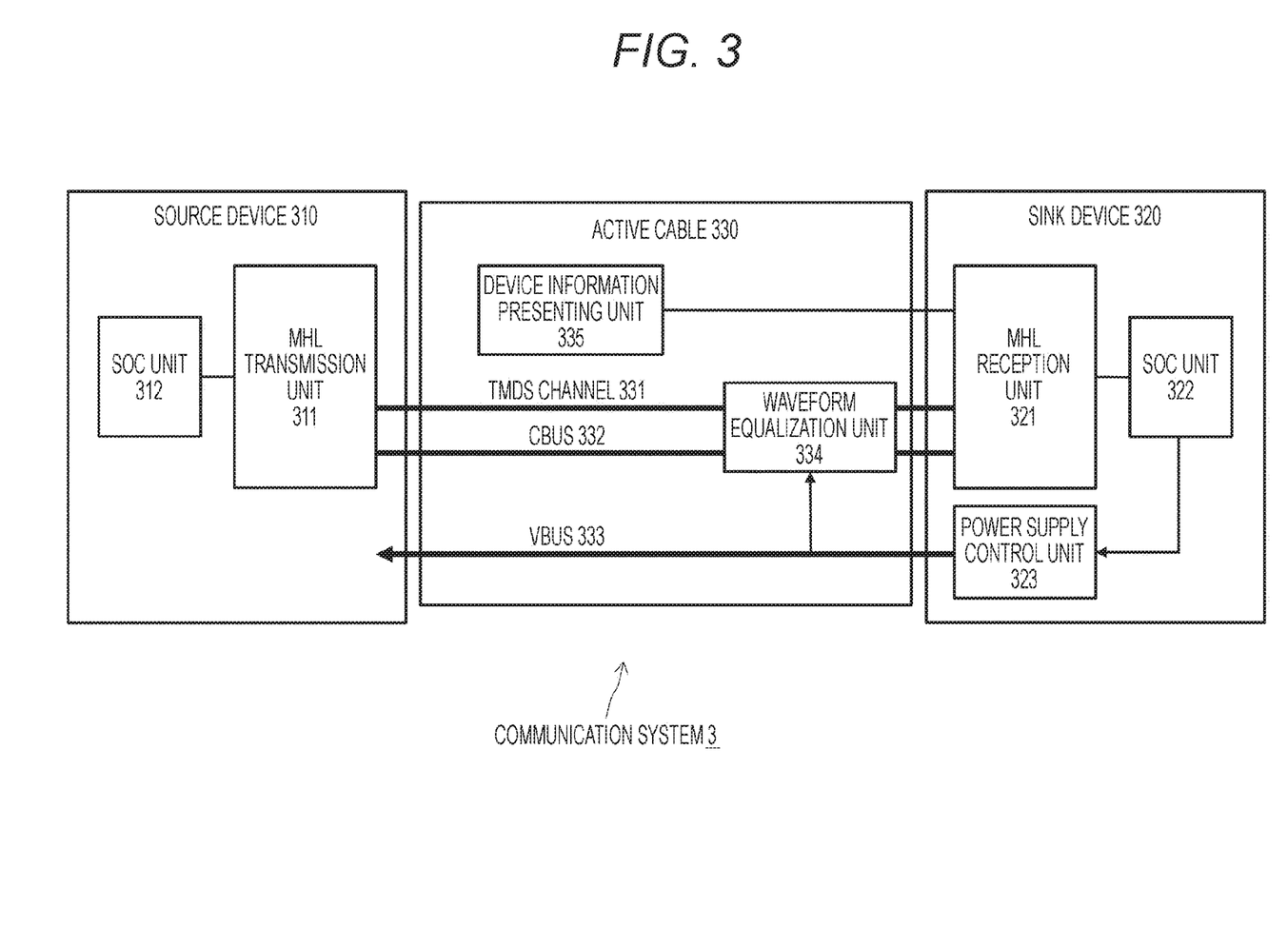
FIG. 3 is a diagram of an exemplary configuration of a communication system 3 for connecting a device including the device information presenting unit to a sink device.

In FIG. 3, an exemplary configuration of a communication system 3 in which a source device 310 and a sink device 320 are connected to each other via an active cable 330 as the need power device is schematically illustrated.

The source device 310 includes an MHL transmission unit 311 and a system on a chip (SOC) unit 312 for realizing general functions as the source device 310. Also, the sink device 320 includes an MHL reception unit 321, a SOC unit 322 for realizing general functions as the sink device 320, and a power supply control unit 323 for controlling power supply.

The active cable 330 includes a TMDS channel 331 which transmits video and audio signals, a CBUS 332 which bidirectionally transmits data between the source device 310 and the sink device 320, a VBUS 333 which transmits the power supplied from the sink device 320, a waveform equalization unit 334 which equalizes waveforms of transmission signals of the TMDS channel 331 and the CBUS 332, and a device information presenting unit 335 which presents device information on power supply of the active cable 330.

With the configuration of the communication system 3 illustrated in FIG. 3, when the active cable 330 is connected to the MHL reception unit 321, the sink device 320 can read the device type of the active cable 330 from the device information presenting unit 335. The MHL reception unit 321 can access the device information presented by the device information presenting unit 335 by using a dedicated line to be connected to the device information presenting unit 335 or the CBUS 332. It is assumed that the device type of the active cable 330 be a need power device. Also, the sink device 320 reads a power amount necessary for the active cable 330 from the device information presenting unit 335. In addition, even before the link with the source device 310 is established, the SOC unit 322 instructs the power supply control unit 323 to supply power to the active cable 330 according to the device type presented by the device information presenting unit 335. As a result, since the power supply from the power supply control unit 323 to the waveform equalization unit 334 in the active cable 330 via the VBUS 333 is started, signal transmission via the TMDS channel 331 and the CBUS 332 becomes available, and the MHL process in the normal mode can be performed.

Figure 4:
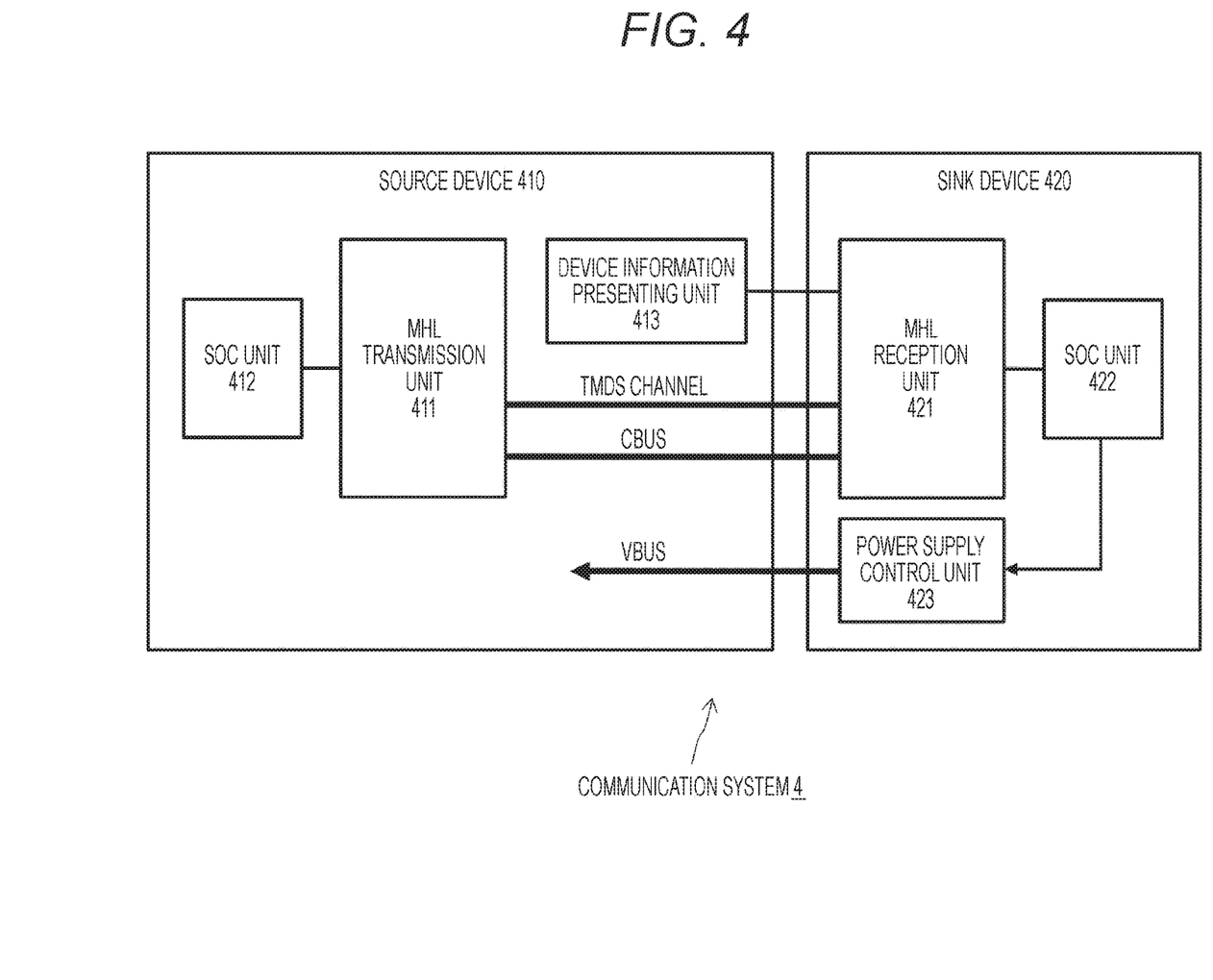
FIG. 4 is a diagram of an exemplary configuration of a communication system 4 for connecting the device including the device information presenting unit to the sink device.

In FIG. 4, an exemplary configuration of a communication system 4 in which a source device 410 is directly connected to a sink device 420 without an MHL cable is schematically illustrated.

The source device 410 includes an MHL transmission unit 411, a SOC unit 412 for realizing general functions as the source device 410, and a device information presenting unit 413 for presenting device information on power supply of the source device 410.

On the other hand, the sink device 420 includes an MHL reception unit 421, a SOC unit 422 for realizing general functions as the sink device 420, and a power supply control unit 423 for controlling power supply. The MHL transmission unit 411 of the source device 410 is connected to the MHL reception unit 421 of the sink device 420 with the TMDS channel for transmitting video and audio signals and the CBUS for bidirectionally transmitting data between the source device 410 and the sink device 420. Also, the power supply control unit 423 of the sink device 420 can supply power to the source device 410 by using the VBUS.

With the configuration of the communication system 4 illustrated in FIG. 4, when being directly connected to the source device 410, the sink device 420 can read the device type of the source device 410 from the device information presenting unit 413. The MHL reception unit 421 can access the device information presented by the device information presenting unit 413 by using a dedicated line to be connected to the device information presenting unit 413 or a CBUS pin. It is assumed that the device type of the source device 410 be a need power device. Also, the sink device 420 reads a power amount necessary for the source device 410 from the device information presenting unit 415. Then, even before the link with the source device 410 is established, the SOC unit 422 instructs the power supply control unit 423 to supply power to the source device 410 according to the device type of the source device 410. As a result, since the power supply from the power supply control unit 423 to the source device 410 is started, signal transmission via the TMDS channel and the CBUS becomes available, and the MHL process in the normal mode can be performed.

Figure 5:
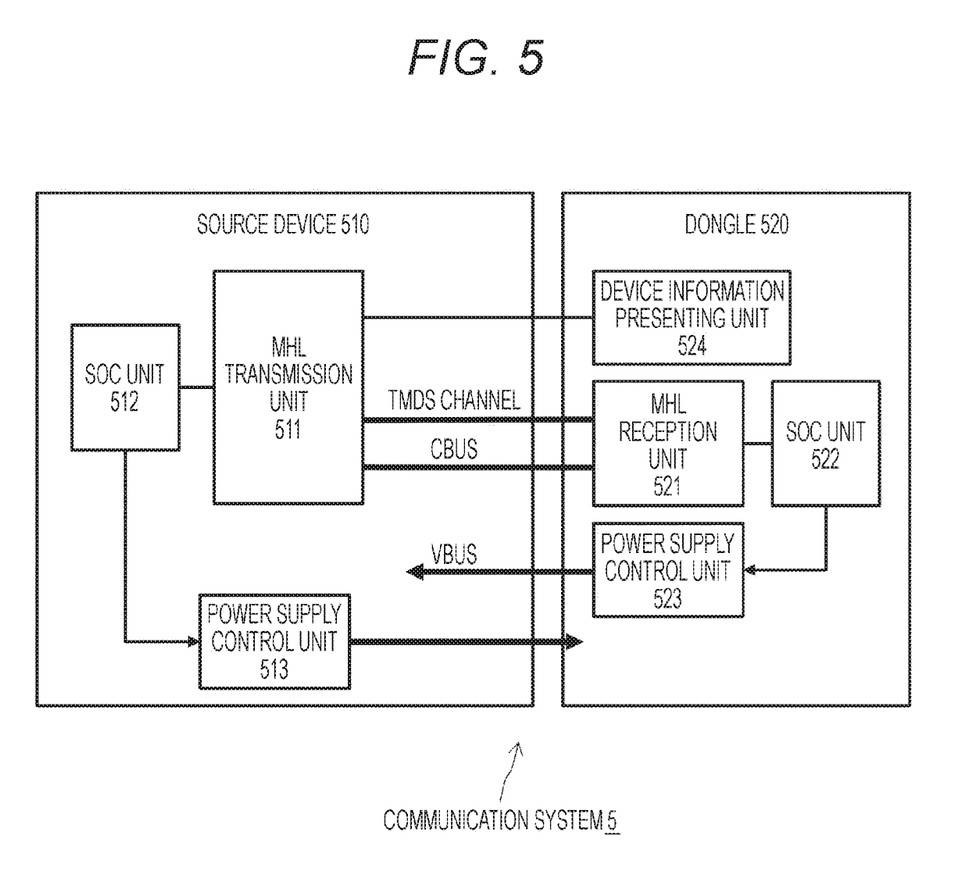
FIG. 5 is a diagram of an exemplary configuration of a communication system 5 for connecting the device including the device information presenting unit to a source device.

In FIG. 5, an exemplary configuration of a communication system 5 in which a dongle 520 is directly connected to a source device 510 is schematically illustrated.

The source device 510 includes an MHL transmission unit 511, a SOC unit 512 for realizing general functions as the source device 510, and a power supply control unit 513 for controlling power supply.

Also, the dongle 520 includes an MHL reception unit 521, a SOC unit 522 for realizing general functions as the dongle 520, a power supply control unit 523 for controlling power supply, and a device information presenting unit 524 relating to power supply of the dongle 520. The MHL transmission unit 511 of the source device 510 is connected to the MHL reception unit 521 of the dongle 520 with the TMDS channel for transmitting video and audio signals and the CBUS for bidirectionally transmitting data between the source device 510 and the dongle 520. Also, the power supply control unit 523 of the dongle 520 can supply power to the source device 510 by using the VBUS.

With the configuration of the communication system 5 illustrated in FIG. 5, when being directly connected to the dongle 520, the source device 510 can read the device type of the dongle 520 from the device information presenting unit 524. The MHL transmission unit 511 can access the device information presented by the device information presenting unit 524 by using a dedicated line to be connected to the device information presenting unit 524 or the CBUS. It is assumed that a device type of the dongle 520 be either one of a need power device and a provide power device. Then, even before the link with the dongle 520 is established, the source device 510 can start to supply and demand power to/from the dongle 520 according to the device type.

When the dongle 520 is a need power device, in the source device 510, even before the link with the dongle 520 is established, the SOC unit 512 instructs the power supply control unit 513 to supply power to the dongle 520 according to the device type of the dongle 520. As a result, since the power supply from the power supply control unit 513 to the dongle 520 is started, signal transmission via the TMDS channel and the CBUS becomes available, and the MHL process in the normal mode can be performed.

On the other hand, when the dongle 520 is a device which can supply power, in the dongle 520, even before the link with the source device 510 is established, the SOC unit 522 instructs the power supply control unit 523 to supply power to the source device 510. Also, in the source device 510, even before the link with the dongle 520 is established, the SOC unit 512 requests the dongle 520 to supply power according to the device type of the dongle 520. As a result, the power supply from the power supply control unit 523 of the dongle 520 to the source device 510 is started, signal transmission via the TMDS channel and the CBUS becomes available, and the MHL process in the normal mode can be performed.

Figure 6:
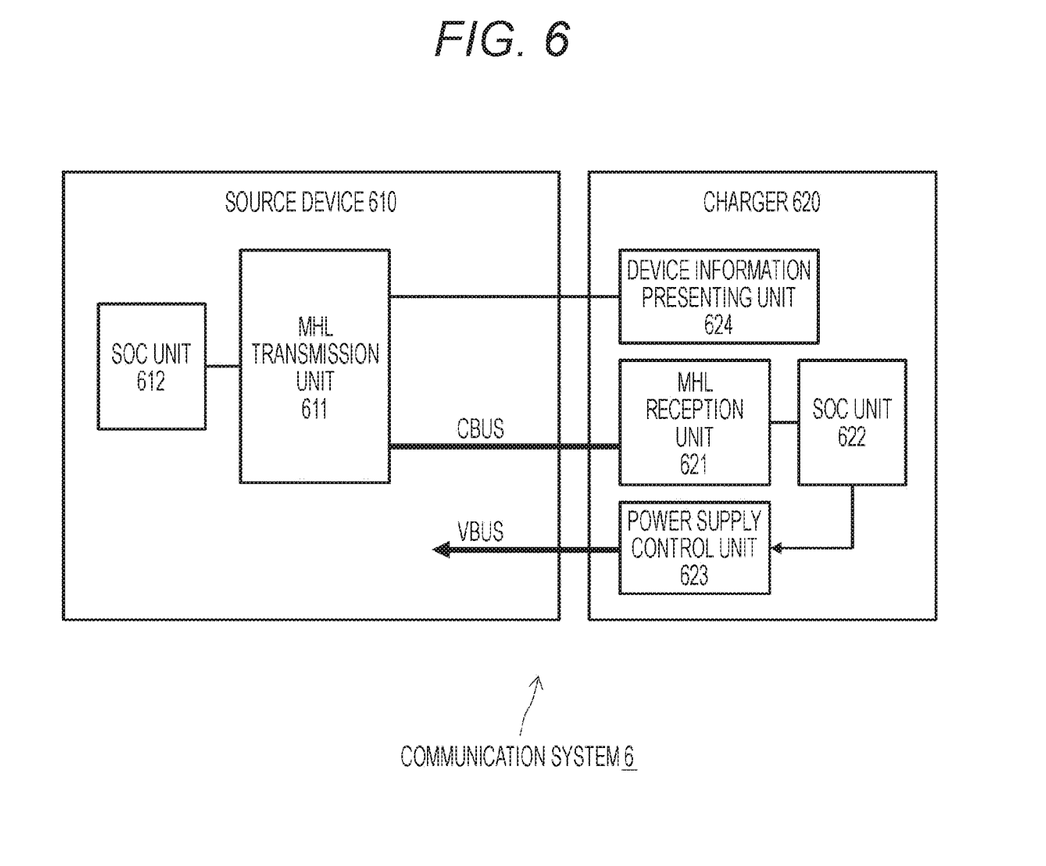
FIG. 6 is a diagram of an exemplary configuration of a communication system 6 for connecting the device including the device information presenting unit to the source device.

In FIG. 6, an exemplary configuration of a communication system 6 in which a charger 620 is directly connected to a source device 610 is schematically illustrated.

The source device 610 includes an MHL transmission unit 611 and a SOC unit 612 for realizing general functions as the source device 610. Also, the charger 620 includes an MHL reception unit 621, a SOC unit 622 for realizing general functions as the charger 620, a power supply control unit 623 for controlling power supply, and a device information presenting unit 624. The MHL transmission unit 611 of the source device 610 is connected to the MHL reception unit 621 of the charger 620 with a CBUS for bidirectionally transmitting data. Also, the power supply control unit 623 of the charger 620 can supply power to the source device 610 by using the VBUS. It is assumed that the TMDS channel be not used.

With the configuration of the communication system 6 illustrated in FIG. 6, when being directly connected to the charger 620, the source device 610 can read the device type of the charger 620 from the device information presenting unit 624. The MHL transmission unit 611 can access the device information presented by the device information presenting unit 624 by using a dedicated line to be connected to the device information presenting unit 624 or the CBUS. It is assumed that the device type in this case be a provide power device. Then, the SOC unit 612 makes the MHL transmission unit 611 transmit a power supply request to the charger 620 via the CBUS according to the device type without establishing the link with the charger 620. As a result, since the power supply from the power supply control unit 623 to the source device 610 is started, the charger 620 can supply power without establishing a link and without performing the MHL process in the normal mode.

Figure 7:
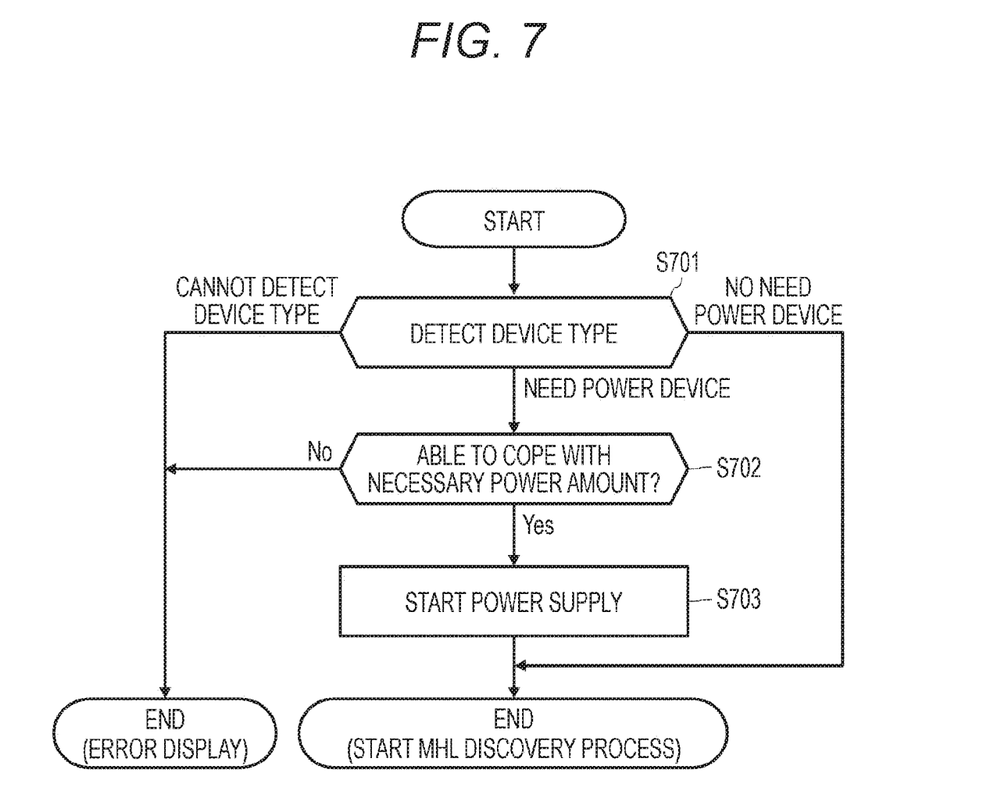
FIG. 7 is a flowchart of a processing procedure performed by the sink device when being connected to the device.

In FIG. 7, a processing procedure performed by a sink device when being connected to a device is illustrated in a form of a flowchart. In the processing procedure illustrated in FIG. 7, the sink devices in the communication systems 3 and 4 illustrated in FIGS. 3 and 4 are expected. For example, a SOC unit in the sink device takes the initiative to perform the processing.

First, the sink device detects a device type of the device from the device information presenting unit of the device connected to the sink device (step S701).

Here, when the device type of the connected device cannot be detected, such as a case where an access to the device information presenting unit is not available, all the following procedures are skipped, and the present processing routine is completed. At this time, an error display may be applied to a user.

Also, when the device type of the device connected to the sink device is a no need power device, since it is not necessary for the sink device to supply power before the link with the connected device is established, the following processing is skipped, and the present processing routine is normally completed. After that, an MHL discovery process is started from the sink device.

Also, when the device type of the device connected to the sink device is a need power device, a necessary power amount is read from the device information presenting unit of the device, and it is further checked whether the sink device can cope with the necessary power amount of the device (step S702).

When the sink device cannot cope with the necessary power amount of the device (No in step S702), the sink device skips all the following processing, and the present processing routine is completed. At this time, an error display may be applied to a user. Since the sink device informs the user by using an error display and the like that a device which needs power equal to or more than a power supply capacity of the sink device is connected, a quality problem such as smoking and ignition caused by an overcurrent can be avoided.

On the other hand, when the sink device can cope with the necessary power amount of the device (Yes in step S702), the sink device starts to supply a necessary amount of power to the device (step S703), and the present processing routine is normally completed. After that, an MHL discovery process is started from the sink device.

Figure 8:
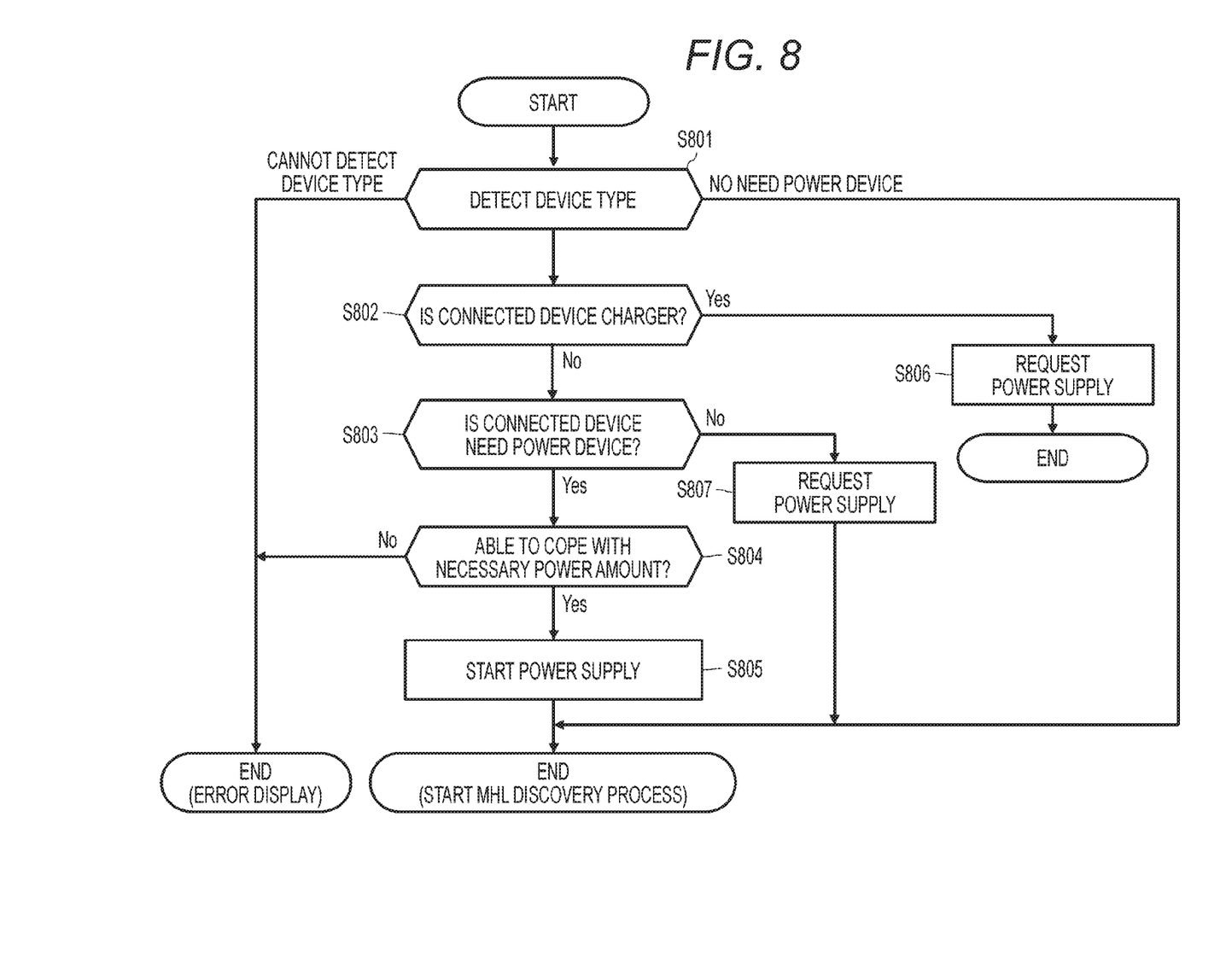
FIG. 8 is a flowchart of a processing procedure performed by the source device when being connected to the device.

Also, in FIG. 8, a processing procedure performed by a source device when being connected to a device is illustrated in a form of a flowchart. In the processing procedure illustrated in FIG. 8, the source devices in the communication systems 5 and 6 illustrated in FIGS. 5 and 6 are expected. For example, a SOC unit of the source device takes the initiative to perform the processing.

First, the source device detects a device type of the device from the device information presenting unit of the device connected to the source device (step S801).

Here, when the device type of the connected device cannot be detected, such as a case where an access to the device information presenting unit is not available, all the following procedures are skipped, and the present processing routine is completed. At this time, an error display may be applied to a user.

Also, when the device type of the device connected to the sink device is a no need power device, since it is not necessary for the sink device to supply power before the link with the connected device is established, the following processing is skipped, and the present processing routine is normally completed. After that, an MHL discovery process is started from the sink device.

Also, when the device type of the device connected to the source device is not a no need power device, it is further checked whether the device is a charger (step S802).

Here, when the device connected to the source device is a charger (Yes in step S802), the source device requests the charger to supply power (step S806), and the present processing routine is completed. In this case, the MHL discovery process is not started.

Also, when the device connected to the source device is not a charger (No in step S802), it is further checked whether the device is a need power device (step S803).

When the device type of the device connected to the source device is a need power device (Yes in step S803), a necessary power amount is read from the device information presenting unit of the device, and it is further checked whether the source device can cope with the necessary power amount of the device (step S804).

When the source device cannot cope with the necessary power amount of the device (No in step S804), the source device skips all the following processing, and the present processing routine is completed. At this time, an error display may be applied to a user. Since the source device informs the user by using an error display and the like that a device which needs power equal to or more than a power supply capacity of the source device is connected, a quality problem such as smoking and ignition caused by an overcurrent can be avoided.

On the other hand, when the source device can cope with the necessary power amount of the device (Yes in step S804), the source device starts to supply the necessary amount of power to the device (step S806), and the present processing routine is normally completed. After that, an MHL discovery process is started from the sink device.

Also, when the device type of the device connected to the source device is not a need power device (No in step S803), the device is a provide power device. In this case, the source device requests the device to supply power (step S807), and the present processing routine is normally completed. After that, an MHL discovery process is started from the sink device.

According to the technology disclosed in the present specification, the following effects can be expected.

(1) Improvement in Quality and Reliability

In the communication system on the basis of the MHL standard, basically, power supply before the establishment of the link is limited. Therefore, when a large-capacity Direct Attached Device (source device) and the active cable are connected to the sink device, a failure such that an operation is not performed, an image is not displayed, and a link is not stable may occur. Whereas, according to the technology disclosed in the present specification, by confirming information on necessity of power supply and a necessary power amount from the connected device, the sink device or the source device can guarantee power supply before the link is established. According to this, the situation such that the operation is not performed and the link is not stable can be avoided. Also, when connected to a device which needs power equal to or more than the power supply capacity of the sink device or the source device, the sink device or the source device informs the user of that by using an error display and the like. Therefore, a quality problem such as smoking and ignition caused by an overcurrent can be avoided.

(2) Improvement in Operability

According to the technology disclosed in the present specification, all the processing relating to the power supply between the sink device or the source device and the device is performed by connecting them to each other. Therefore, the optimal setting and operation can be secured without making the user be conscious of it.

(3) Simplification and Diversification of Device Design

In the communication system on the basis of the MHL standard, basically, power supply before the establishment of the link is limited. Therefore, a Direct Attached Device (source device) which requires high-load processing needs a device, which is dedicated to connect the link, with low power consumption and a low power consumption mode. Whereas, according to the technology disclosed in the present specification, the necessary power amount can be obtained before the link is established. Therefore, a special device and the low power consumption mode become unnecessary, and the design is simplified. Accordingly, cost reduction can be expected.

Also, to receive power supply from the MHL sink device and the like, it is necessary for the device to mount an MHL interface including all the signal lines such as the TMDS and the CBUS. Whereas, according to the technology disclosed in the present specification, by using a device information presenting unit including a memory chip and the like, a mechanism of power supply can be simplified, and an MHL-compliant charger and dongle can be easily designed. Also, a device such as a dongle which transmits data by using a data signal line such as a CBUS (that is, does not use TMDS channel) can be designed.

INDUSTRIAL APPLICABILITY

The technology disclosed in the present specification has been described in detail above with reference to the specific embodiment. However, it is obvious that those skilled in the art can amend and substitute the embodiment without departing from the scope of the technology disclosed in the present specification.

In the present specification, the embodiment has been mainly described in which the technology disclosed in the present specification has been applied to the communication system having the devices connected to each other with the MHL-based communication interface. However, the scope of the technology disclosed in the present specification is not limited to this. The technology disclosed in the present specification can be similarly applied to a communication system complying with various communication interface standards for transmitting video information and audio information and supplying power.

In a word, the technology disclosed in the present specification has been described as an example, and the matter described in the present specification should not be restrictively interpreted. Claims should be considered in order to determine the scope of the technology disclosed in the present specification.

Furthermore, the technology disclosed in the present specification can have the following configuration.

(1) A communication device including:
a connection unit configured to connect an external device according to a predetermined communication interface standard; and
a control unit configured to control power supply to/from the external device on the basis of device information read from a device information presenting unit included in the external device.

(2) The communication device according to (1), wherein the device information presenting unit has device type information indicating which one of a no need power device, a need power device, and a provide power device the external device is, and
the control unit controls power supply to/from the external device on the basis of the read device type information.

(3) The communication device according to (2), wherein the control unit requests the external device to supply power when the external device connected to the connection unit is a provide power device.

(4) The communication device according to (2), wherein the control unit supplies power to the external device when the external device connected to the connection unit is a need power device.

(5) The communication device according to (4), wherein the control unit controls power supply to the external device on the basis of a necessary power amount of the external device read from the device information presenting unit.

(6) The communication device according to (5), wherein the control unit displays an error when the control unit is not available to cope with the necessary power amount of the external device.

(7) The communication device according to (1), wherein the control unit displays an error when the device information is not read from the external device connected to the connection unit.

(8) The communication device according to (1), wherein the control unit controls power supply to/from the external device before a link with the external device is established on the basis of the predetermined communication interface standard.

(9) The communication device according to (1), wherein the predetermined communication interface standard is an MHL standard.

(10) A communication method including:
a connection step of connecting an external device according to a predetermined communication interface standard; and
a control step of controlling power supply to/from the external device on the basis of device information read from a device information presenting unit included in the external device.

REFERENCE SIGNS LIST 3 communication system
310 source device
311 MHL transmission unit
312 SOC unit
320 sink device
321 MHL reception unit
322 SOC unit
323 power supply control unit
330 active cable
331 TMDS channel
332 CBUS
333 VBUS
334 waveform equalization unit
335 device information presenting unit
4 communication system
410 source device
411 MHL transmission unit
412 SOC unit
413 device information presenting unit
420 sink device
421 MHL reception unit
422 SOC unit
423 power supply control unit
5 communication system
510 source device
511 MHL transmission unit
512 SOC unit
513 power supply control unit
520 sink device
521 MHL reception unit
522 SOC unit
523 power supply control unit
524 device information presenting unit
6 communication system
610 source device
611 MHL transmission unit
612 SOC unit
620 charger
621 MHL reception unit
622 SOC unit
623 power supply control unit
624 device information presenting unit

The invention claimed is:
1. A communication device, comprising:
a circuitry configured to:
connect an external device according to a communication interface standard;
acquire device information by a dedicated line from a memory in the external device, wherein
the device information includes device type information of the external device, and
the device type information indicates one of a no need power device, a need power device, or a provide power device;
determine a type of the external device based on the device information;

control power supply to or from the external device based on the type of the external device; and transmit uncompressed moving-image video information and audio information to the external device via at least one channel associated with the communication interface standard, wherein the at least one channel is activated for signal transmission based on the control of the power supply.

2. The communication device according to claim 1, wherein the circuitry is further configured to request the external device to supply power based on the external device that is the provide power device.

3. The communication device according to claim 1, wherein the circuitry is further configured to control the power supply to the external device based on the external device that is the need power device.

4. The communication device according to claim 3, wherein the circuitry is further configured to control the power supply to the external device based on a necessary power amount of the external device read from the memory.

5. The communication device according to claim 4, wherein the circuitry is further configured to display an error message based on a determination that the circuitry is not able to cope with the necessary power amount of the external device.

6. The communication device according to claim 1, wherein the circuitry is further configured to display an error message based on a determination that the device information is not read from the external device.

7. The communication device according to claim 1, wherein the circuitry is further configured to control the power supply to or from the external device before a link with the external device is established based on the communication interface standard.

8. A communication method, comprising:

connecting an external device according to a communication interface standard;

acquiring device information by a dedicated line from a memory in the external device, wherein the device information includes device type information of the external device, and the device type information indicates one of a no need power device, a need power device, or a provide power device;

determining a type of the external device based on the device information;

controlling power supply to or from the external device based on the type of the external device; and transmitting uncompressed moving-image video information and audio information to the external device via at least one channel associated with the communication interface standard, wherein the at least one channel is activated for signal transmission based on the control of the power supply.

* * * * *